Patented Jan. 2, 1923.

1,441,143

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing.   Application filed April 5, 1921.   Serial No. 458,738.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in methyl alcohol or toluene, it has been found that such single solvents by themselves do not dissolve a sufficient proportion of the ethers to make a desirable thick flowable composition or dope, such as may be used in the manufacture of photographic film base by the customary methods, or in the other plastic arts.

I have discovered that an adequately strong and useful solvent may be prepared by mixing these substances. While the proportions may vary considerably, I find a useful range to be from 50 to 25 parts of methyl alcohol and from 50 to 75 parts of toluene by weight. The amount of cellulose ether dissolved in such compound solvent may also be altered widely. By way of example, I may dissolve 1 part of water-insoluble ethyl cellulose in 5 parts of such compound solvent. Other substances which impart additional suppleness or incombustibility, or other qualities, to the film may then be added to the dope, such modifying agents being, for example, triphenyl or tricresyl phosphate, camphor, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Some of the toluene may remain in the film or other product and impart additional flexibility to it, the alcohol passing out more rapidly than the hydrocarbon during the setting and curing of the film.

Having thus described my invention, what I claim as new and desire to secure by Letters Patent is:

1. A compound solvent for alkyl ethers of cellulose, comprising a mixture of methyl alcohol and toluene.

2. A compound solvent for alkyl ethers of cellulose, comprising from 50 to 25 parts by weight of methyl alcohol and 50 to 75 parts by weight of toluene.

3. A viscous flowable film-forming composition, comprising an alkyl ether of cellulose dissolved in a mixture of methyl alcohol and toluene.

4. A viscous flowable film-forming composition, comprising an alkyl ether of cellulose dissolved in a compound solvent containing from 50 to 25 parts by weight of methyl alcohol and 50 to 75 parts of toluene.

5. A composition of matter, comprising water-insoluble ethyl cellulose dissolved in a mixture of methyl alcohol and toluene.

6. A composition of matter, comprising a solution of 1 part by weight of water-insoluble ethyl cellulose in substantially 5 parts of a mixture containing methyl alcohol and toluene.

Signed at Rochester, New York, this 30th day of March, 1921.

STEWART J. CARROLL.